United States Patent [19]
Suzuki

[11] Patent Number: 5,579,525
[45] Date of Patent: Nov. 26, 1996

[54] PIPELINED ARRANGEMENT INCLUDING DATA PROCESSING STORAGES HAVING DYNAMIC LATCHES FOR REDUCING DELAY IN DATA PROCESSING

[75] Inventor: Kazumasa Suzuki, Tokyo, Japan

[73] Assignee: NEC Corporation, Tokyo, Japan

[21] Appl. No.: 270,650

[22] Filed: Jul. 5, 1994

[30] Foreign Application Priority Data

Jul. 2, 1993 [JP] Japan ................................ 5-163706

[51] Int. Cl.⁶ ...................................................... G06F 13/00
[52] U.S. Cl. .................... 395/800; 395/591; 364/DIG. 1; 364/231.8; 364/241.2; 364/281.8
[58] Field of Search .................................. 395/800, 375, 395/775, 500

[56] References Cited

PUBLICATIONS

"Modular Technique for Constructing Control Logic of a Pipelined Processor", IBM Technical Disclosure Bullentin, vol. 32, No. 7, Dec. 1989, pp. 403–425.

Hoe et al., "Pipelining of Gaas Dynamic Logic Circuits", 1992 IEEE International Symposium on Circuits and Systems, May 1992, pp. 208–211.

Patent Abstracts of Japan, vol. 7, No. 125 & JP–A–58 043 042, May 1993, Mar. 1983.

*Primary Examiner*—Mehmet B. Geckil
*Attorney, Agent, or Firm*—Foley & Lardner

[57] ABSTRACT

A pipelined data processing arrangement which is subject to an instruction interrupt is disclosed. The pipelined arrangement is provided with a plurality of stages each of which has a temporary storage. In order to increase an actual time for executing instructions in the pipelined arrangement, the temporary storages which exhibit large delay are replaced by dynamic latches each having a smaller delay time without adversely affecting the operation of the pipelined arrangement.

4 Claims, 12 Drawing Sheets

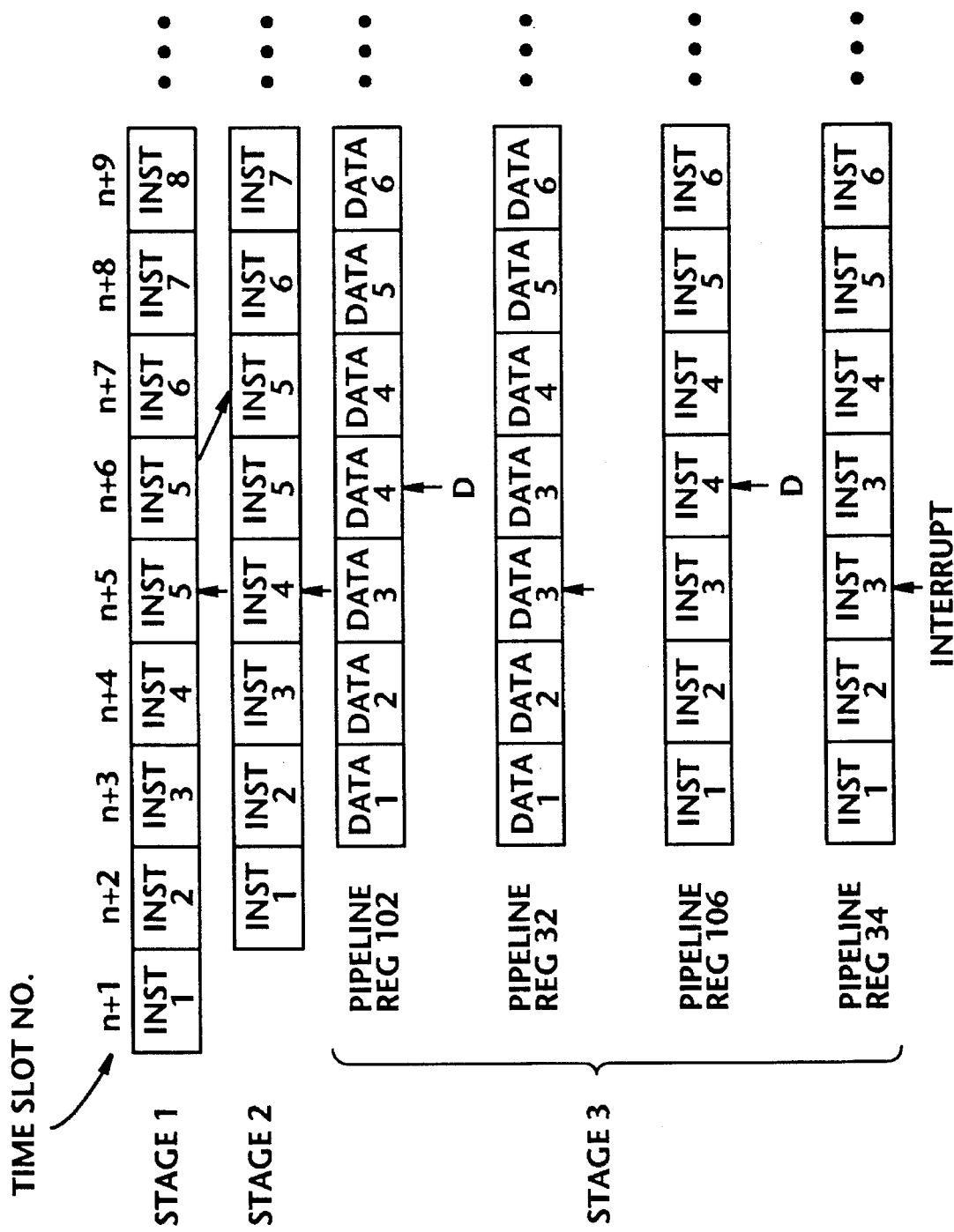

PIPELINED ARRANGEMENT INCLUDING DATA PROCESSING STORAGES HAVING DYNAMIC LATCHES FOR REDUCING DELAY IN DATA PROCESSING

BACKGROUND OF THE INVENTION

1. Field of the Invention

The present invention relates generally to improvements in pipelining in a microcomputer system and more specifically to a pipelined arrangement and of increasing a data processing time in certain stages of pipelining which is provided with instruction interrupt functions.

2. Description of the Prior Art

Pipelining is a hardware technique for achieving higher performance by breaking a complex, time-consuming function into a series of simpler, shorter operations, each of which can then be executed in an assembly-line fashion with simultaneous computations on different sets of data.

A time duration for data processing in each stage of a pipelined data processing system, is limited by delay induced by a pipeline register in each stage. The pipeline register is configured such as to temporarily store an instruction and/or data in response to an interrupt request which is issued in the case of a resource or data competition or conflict.

Before turning to the present invention it is deemed preferable to briefly discuss a known pipelined arrangement with reference to FIGS. 1–6.

FIG. 1 is a block diagram of a pipelined data processing system which includes five stages 1–5 in this particular case and to which the present invention is applicable. However, it should be noted that the present invention is in no way limited to such an arrangement.

Throughout the instant disclosure, hardware arrangements which are deemed irrelevant to the present invention will be omitted merely for the sake of brevity.

As shown in FIG. 1, the stage 1 includes a selector 10, a pipeline register 12, an instruction memory 14, and an adder 16. The stage 1 is to successively read out instructions previously stored in the instruction memory 14. The selector 10 is supplied with three inputs 18a–18c and selects one among them under the control of selector control signals RESET and INT. The control sinal RESET is to initially reset the selector 10, while the other control signal INT is applied to the selector 10 from an instruction decoder 20 of the stage 2 if an instruction interrupt occurs as will be discussed below.

Prior to initiating the operation of the pipelined arrangement of FIG. 1, an instruction set is retrieved from a main memory by way of an instruction bus (neither shown) and is then stored in the memory 14. In the case where an instruction interrupt does not occur, the selector 10 selects the input 18b (viz., output of the adder 16). A loop consisting of the blocks 10, 12 and 16 exhibits an address counter.

The stage 2 is provided to decode the instructions retrieved from the instruction memory 14 and, includes a selector 22, a pipeline register 24, and a register file 26 in addition to the above mentioned instruction decoder 20. The decoder 20 receives the output of the pipeline register 24 and applies successively the instructions decoded to the stage 3. If an instruction interrupt does not occur, the selector 22 selects the output (viz., instructions) retrieved from the memory 14. As is known in the art, the register file 26 is used to temporarily store instructions and/or data for future use.

The stage 3 is a stage for implementing arithmetic operations on the data derived from the register file 26. The stage 3 includes two selectors 28 and 30, two pipeline registers 32 and 34, and an arithmetic logic 36. If the instruction interrupt INT is not issued from the decoder 20, the selectors 28 and 30 select respectively the outputs of the decoder 20 and the register file 26.

The stage 4 includes two selectors 38 and 40, two pipeline registers 42 and 44, and a data memory 46. The stage 4 is a stage for accessing a data memory 46 for writing data thereinto and reading data therefrom. As in the above, if the instruction interrupt INT is not issued from the decoder 20, the selectors 38 and 40 select respectively the outputs of the blocks 36 and 34 of the preceding stage (viz., the stage 3).

Lastly, the stage 5 includes three selectors 48, 50 and 52, two pipeline registers 54 and 56, and a register file 26'. The selector 48 selects either of the outputs of the blocks 42 and 46 of the stage 4 in response to an instruction applied thereto from the pipeline register 44 of the stage 4. The register file 26' is usually configured in the same unit as the above mentioned register file 26 of the stage 2 and as such, the register file of the stage 5 is depicted by the same numeral as the register file of the stage 2 with a prime. If the decoder 20 does not issue the instruction interrupt INT, the selectors 50 and 52 respectively pick up the outputs of the preceding selector 48 and the pipeline register 44.

Reference is made to FIG. 2, wherein a timing chart is shown for discussing the operation of the pipelined arrangement of FIG. 1 when the instruction decoder 20 issues an instruction interrupt.

It is assumed that the instruction decoder 20 detects, at time slot (n+6), that an interrupt for one time slot (viz., freezing of instruction execution during the next time slot (n+7)) is necessary. Such an interrupt may be induced if a resource conflict (for example) with an instruction running in other pipelined arrangement (for example) occurs. The instruction decoder 20 issues an interrupt signal INT, during time slot (n+6), which is applied to the selectors of the stage 1 to the stage 5 (viz., selectors 10, 22, 28–30, 38–40, and 50–52).

The selector 10 is responsive to the interrupt signal INT issued at time slot (n+6) and selects the output of the pipeline register 12 (viz., input signal 18c) at the next time slot (n+7). Thus, the stage 1 holds the instruction No. 6 at time slot (n+7) in the instant case. In the similar manner, the selector 22 of the stage 2, in response to the interrupt signal INT, selects the output of the pipeline register 24 and thus, the stage 2 holds the instruction No. 5 at time slot (n+7).

In the stage 3, the selector 28 responds to the interrupt signal INT and selects the output of the pipeline register 32. This implies that the pipeline register 32 retains, at time slot (n+7), the same content as that at the previous time slot (n+6). Further, in the stage 3, the selector 30, in response to the interrupt signal INT, selects the output of the pipeline register 34 and accordingly, the instruction No. 4 which has been applied thereto at time slot (n+6) is retained at the following timing slot (n+7). It is understood from the foregoing that each of the stages 4 and 5 holds the preceding situation at time slot (n+7) as shown in FIG. 2.

FIG. 3 is a block diagram showing in detail the arrangement of the selector 10 and the pipeline register 12. As shown, the selector 10 is comprised of a plurality of selector logics 10(1)–19(n) (n is 34 (for example)) each of which is configured in exactly the same manner with one another and which selects one-bit signal from three one-bit signals applied thereto.

The pipeline register 12 of FIG. 3 includes a plurality of flip-flops 12(1)–(12(n) which are configured in exactly the same manner with one another and which are respectively coupled to the corresponding selector logics 10(1)–19(n). Each of the selecting logics 10(1)–10(n) normally (viz., when no interrupt signal is applied) selects one-bit signal forming part of the signal 18b issued from the adder 16. However, if the instruction decoder 20 (stage 2) issues the interrupt signal INT, each of the selecting elements 10(1)–10(n) selects the output of the associated flip-flop via a feedback loop (no numeral).

FIG. 4 is a block diagram showing in detail the flip-flop 12(1) together with the associated selector 10(1).

As shown in FIG. 4, the flip-flop 12(1) is comprised of four switches 60a–60b and 62a–62b, and four inverters 64a–64d. Each of the switches 60a–60b closes in response to a high logic level (for example) while opening in response to the reverse (viz., low) logic level. Contrarily, each of the switches 62a–62b closes and opens when a low and high logic levels are applied thereto, respectively.

That is, the switches 60a–60b and 62a–62b operate in a complementary fashion during each cycle of the clock. One bit signal which has been selected by the selector 10(1), is acquired via the switch 60a while it is closed. Following this, when the switches 60a and 62b are respectively rendered open and closed during the next half cycle, the acquired bit is retained in a loop denoted by L1. At the same time, the bit signal held in the loop L1 appears at the output of the flip-flop 12(1). Subsequently, when the next bit signal is acquired through the switch 60a during the first half of the next clock cycle, the bit signal already acquired is retained in a loop L2. These operations are well known in the art. Each of the other flip-flops 12(2)–12(n) of the pipeline register 24 is constructed in exactly the same manner as the above mentioned flip-flop 12(1).

FIG. 5 is a block diagram showing in detail the arrangement of the selector 22 and the pipeline register 24 (stage 2). As illustrated, the selector 22 is comprised of a plurality of selector logic 22(1)–22(n) each of which is configured in exactly the same manner with one another and which selects one-bit signal from two one-bit signals applied thereto. It will readily be appreciated that the selector 22 and the pipeline register 24 both of FIG. 5 are respectively configured in exactly the same manner as the counterparts 10 and 12 shown in FIG. 3. Accordingly, further descriptions thereof will be omitted for brevity.

Each of the other pairs of the selector and the pipeline register such as depicted by 28–32, 30–34 (both the stage 3), 38–42 and 40–44 (the stage 4), and 50–54 and 52–56 (the stage 5), is arranged as shown in FIG. 5.

FIG. 6 is a block diagram showing in detail the flip-flop 24(1) together with the associated selector 22(1). The flip-flop 24(1) is the same as the flip-flop 12(1) shown in FIG. 4 and thus, each of the circuit elements of the flip-flop 24(1) is labelled like numeral plus a prime. Further discussion of FIG. 6 is deemed redundant and accordingly will not be given here for simplifying the disclosure.

The prior art shown in FIGS. 1–6 has encountered the problem in that each of the pipeline registers in the stages 1–5 exhibits a relatively large amount of delay. The reason for this is that the pipeline register in question takes the form of a flip-flop for retaining an instruction or data for one or more time slots in an event of occurrence of an interrupt request. Therefore, if the time delay at some stages due to the pipeline register can be reduced, a time saved by reducing the delay is effectively used for data processing. By way of example, let it be assumed that one time slot is 5 ns and the delay is 1 ns. In this case, a time duration allocated to data processing is 4 ns. Therefore, if the delay can be shortened to 0.3 ns (for example) then the data processing time is extended to 4.7 ns.

SUMMARY OF THE INVENTION

It is therefore an object of the present invention to provide a method and hardware arrangement via which a ratio of data processing time to delay in certain pipelining stages can effectively be increased.

A first aspect of the present invention resides in a pipelined data processing arrangement having a plurality of stages which are coupled in series and each of which includes temporary storage means, comprising: a first stage for successively issuing a plurality of instructions in synchronism with time slots, the first stage including first storage means which, in response to occurrence of an interrupt request, retains therein an instruction applied thereto over one or more time slots which follow a time slot wherein the interrupt request has been issued; a second stage coupled to decode each of the instructions applied thereto from the first stage, the second stage issuing the interrupt request if pipelined operation should be interrupted, the second stage including second storage means which, in response to the interrupt request, retains therein a decoded instruction over one or more time slots which follow the time slot wherein the interrupt request has been issued; a plurality of data processing stages which follow the second stage, each of the data processing stages including a register for holding a data processing instruction applied from a stage preceded thereby only during a time slot for which the data processing instruction is applied thereto.

A second aspect of the invention resides in a pipelined data processing arrangement having a plurality of stages which are coupled in series and each of which includes a temporary storage register, comprising: a first stage for successively issuing a plurality of instructions in synchronism with time slots, the first stage including first storage means which, in response to occurrence of an interrupt request, retains therein an instruction applied thereto over one or more time slots which follow a time slot wherein the interrupt request has been issued; a second stage coupled to decode each of the instructions applied thereto from the first stage, the second stage issuing the interrupt request if pipelined operation should be interrupted, the second stage including second storage means which holds a decoded instruction only during a time slot for which the decoded instruction is applied to thereto; and a third stage coupled to the second stage, the third stage including: third storage means which, in response the interrupt request, retains therein a first instruction applied thereto from the second stage over one time slot which follows a time slot wherein the interrupt request has been issued, the first instruction being applied to the third storage means at a time slot wherein the interrupt request is issued; and fourth storage means which, in response to the interrupt request, retains therein a second instruction applied thereto from the second stage over one time slot which follows two consecutive time slots wherein the interrupt request has been issued at the former time slot of the two cosecutive time slots, the second instruction being applied to the fourth storage means at a time slot immediately after the interrupt request is issued, wherein the third storage means acquiring the second instruction stored in the fourth storage means at the latter time slot of the two consecutive time slots.

BRIEF DESCRIPTION OF THE DRAWINGS

The features and advantages of the present invention will become more clearly appreciated from the following description taken in conjunction with the accompanying drawings in which like elements are denoted by like reference numerals and in which:

FIG. 14 is timing chart for discussing the operation of the second embodiment of FIG. 13.

DETAILED DESCRIPTION OF THE PREFERRED EMBODIMENTS

Figure 7:
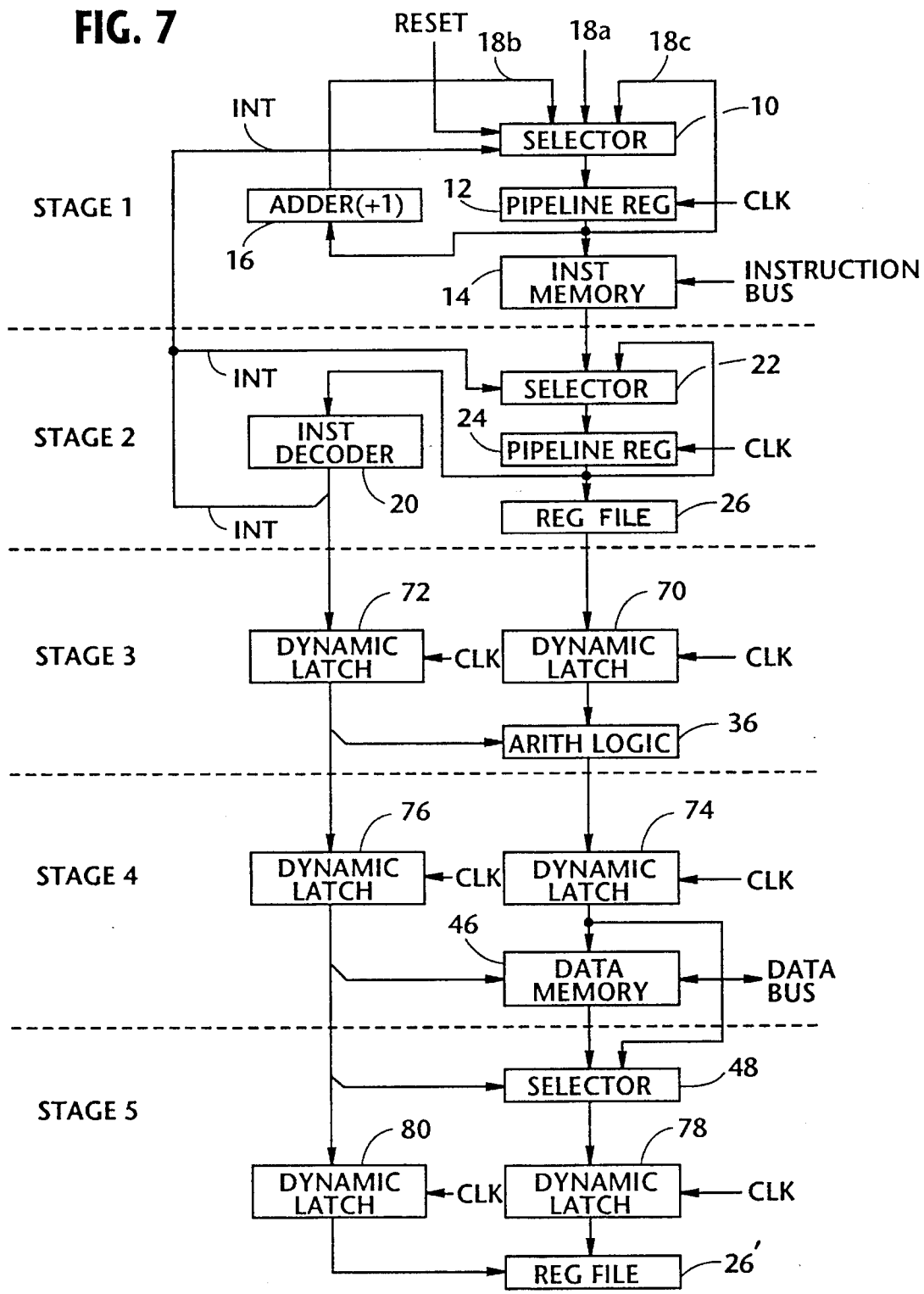
FIG. 7 is a block diagram schematically showing a first embodiment of the present invention.

Reference is now made to FIG. 7, wherein the first embodiment of the present invention is schematically illustrated in block diagram form.

A principle underlying the present invention will first be described.

As already discussed with reference to FIG. 1, the stage 2 includes the instruction decoder 20 which issued the interrupt signal INT in addition to the decoded instructions. In order to deal with the interrupt (viz., information holding) requests over one or more than one time slots, each pipeline register in the stages 1–5 takes the form of a flip-flop.

However, the inventor of the instant invention noticed that the stages 3–5 which follow the stage 2 need not to be configured such as to deal with the interrupt (viz., information retaining) requests. That is, each of the pipeline registers in the stages 3–5 for implementing data processing is sufficient if it is a simple latch which has no function of retaining a decoded instruction or data over two or more time slots. In other words, each of the pipeline registers in the stage 3–5 can be replaced with a dynamic type latch which exhibits a very small amount of delay as compared with the flip-flop and which is able to only retain information applied thereto only during the time slot for which the information or data is applied.

The first embodiment takes advantage of the above mentioned concept.

Figure 1:
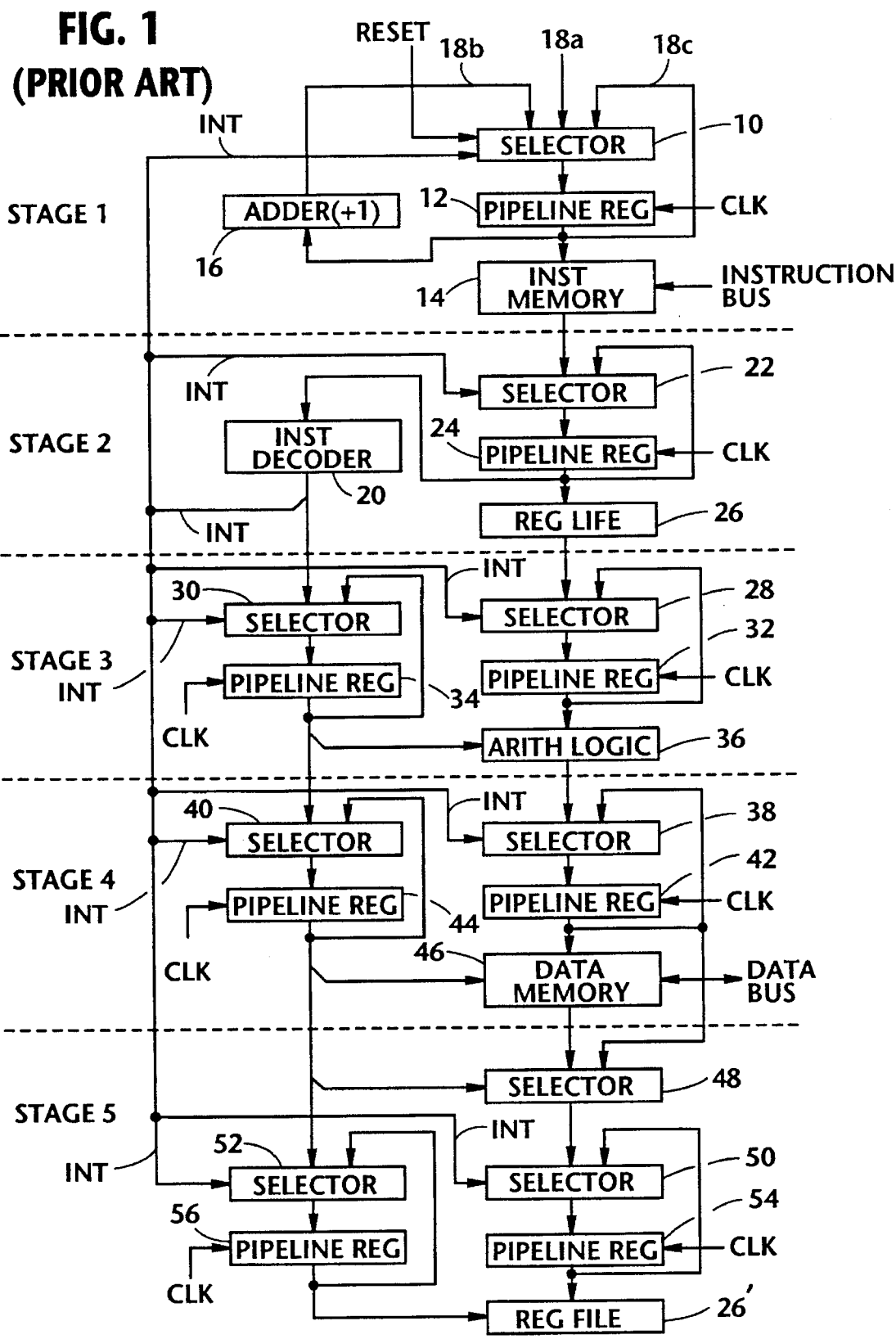
FIG. 1 is a block diagram schematically showing a known pipelined arrangement, having been described in the opening paragraphs of the instant disclosure.
Figure 2:
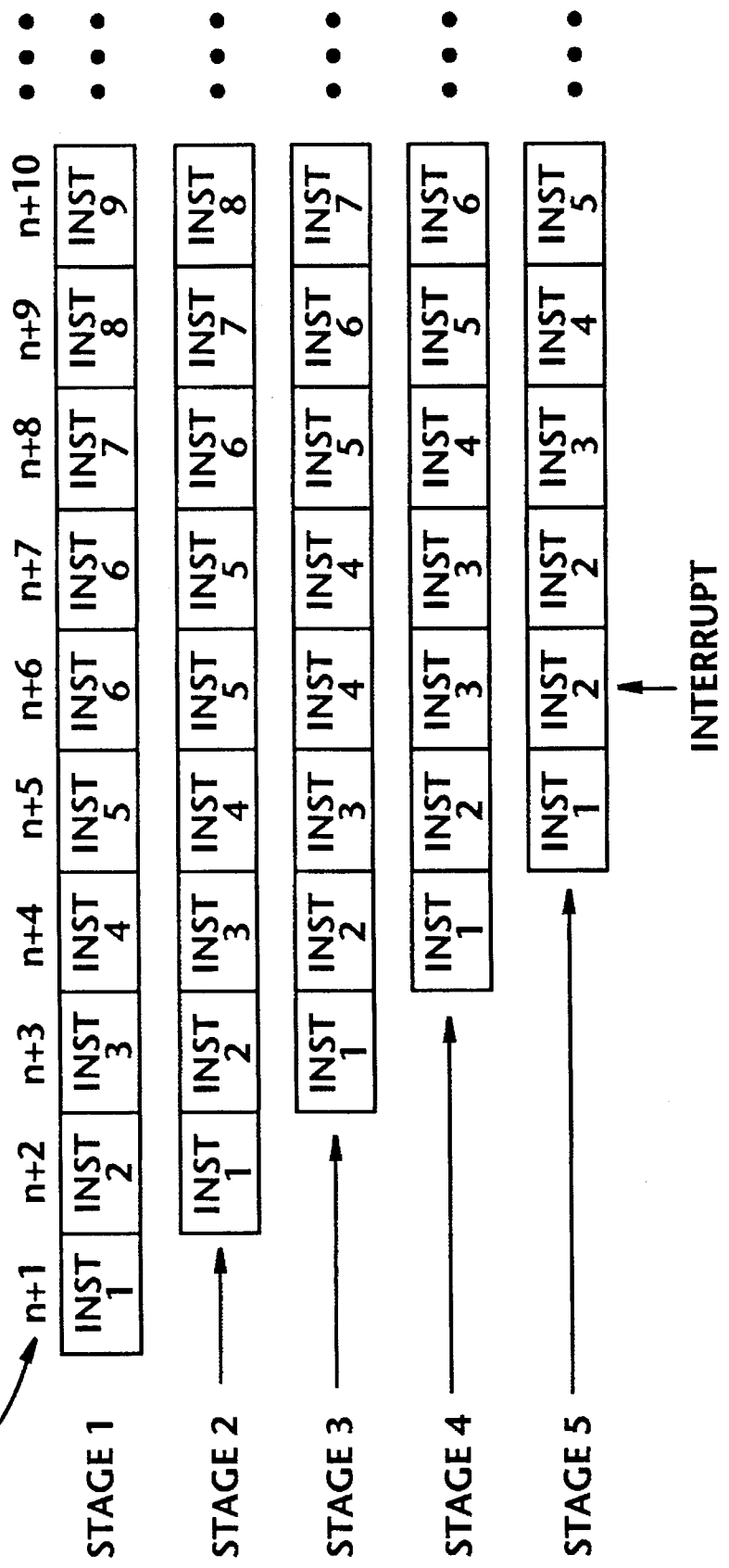
FIG. 2 is a timing chart for describing the operation of the pipelined arrangement of FIG. 1.

As shown in FIG. 7, a dynamic latch 70 of the stage 3 replaces the selector 28 and the pipeline register 32 of FIG. 1, while a dynamic latch 72 of the stage 3 is provided in place of the selector 30 and the pipeline register 34 of FIG. 1. In the same manner, a dynamic latch 74 of the stage 4 replaces the selector 38 and the pipeline register 42, while a dynamic latch 76 of the stage 4 replaces the selector 40 and the pipeline register 44. Further, in the stage 5 of FIG. 7, a dynamic latch 78 replaces the selector 50 and the pipeline register 54 of FIG. 1 while a dynamic latch 80 replaces the selector 52 and the pipeline register 56 of FIG. 1. The remaining portions of FIG. 7 is identical to the corresponding portions of FIG. 1 and therefore, the descriptions thereof will not be given for brevity.

Figure 4:
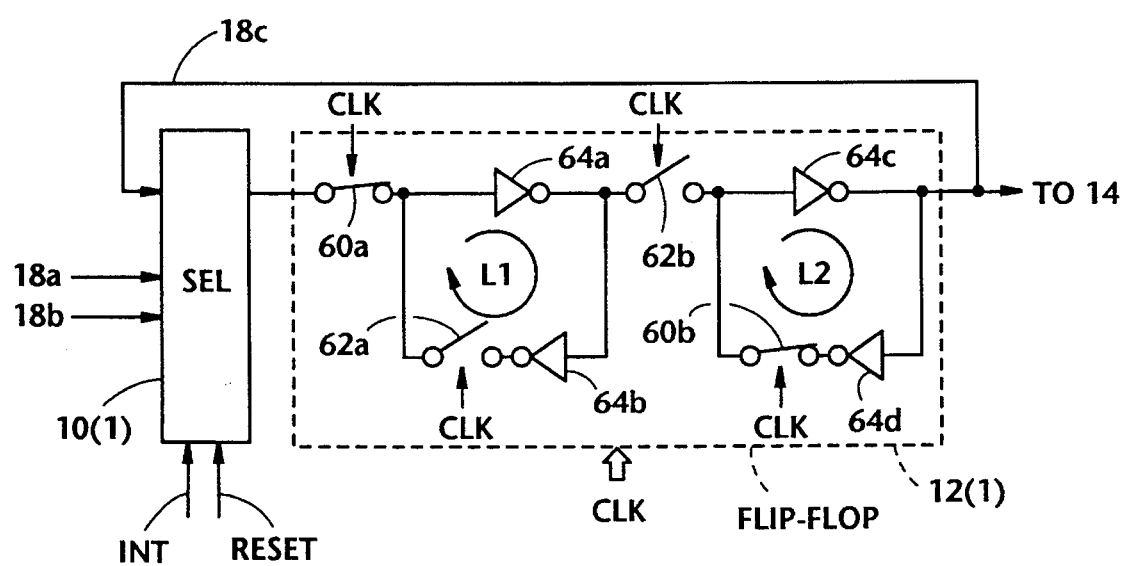
FIG. 4 is a block diagram showing in further detail one block of FIG. 3.
Figure 5:
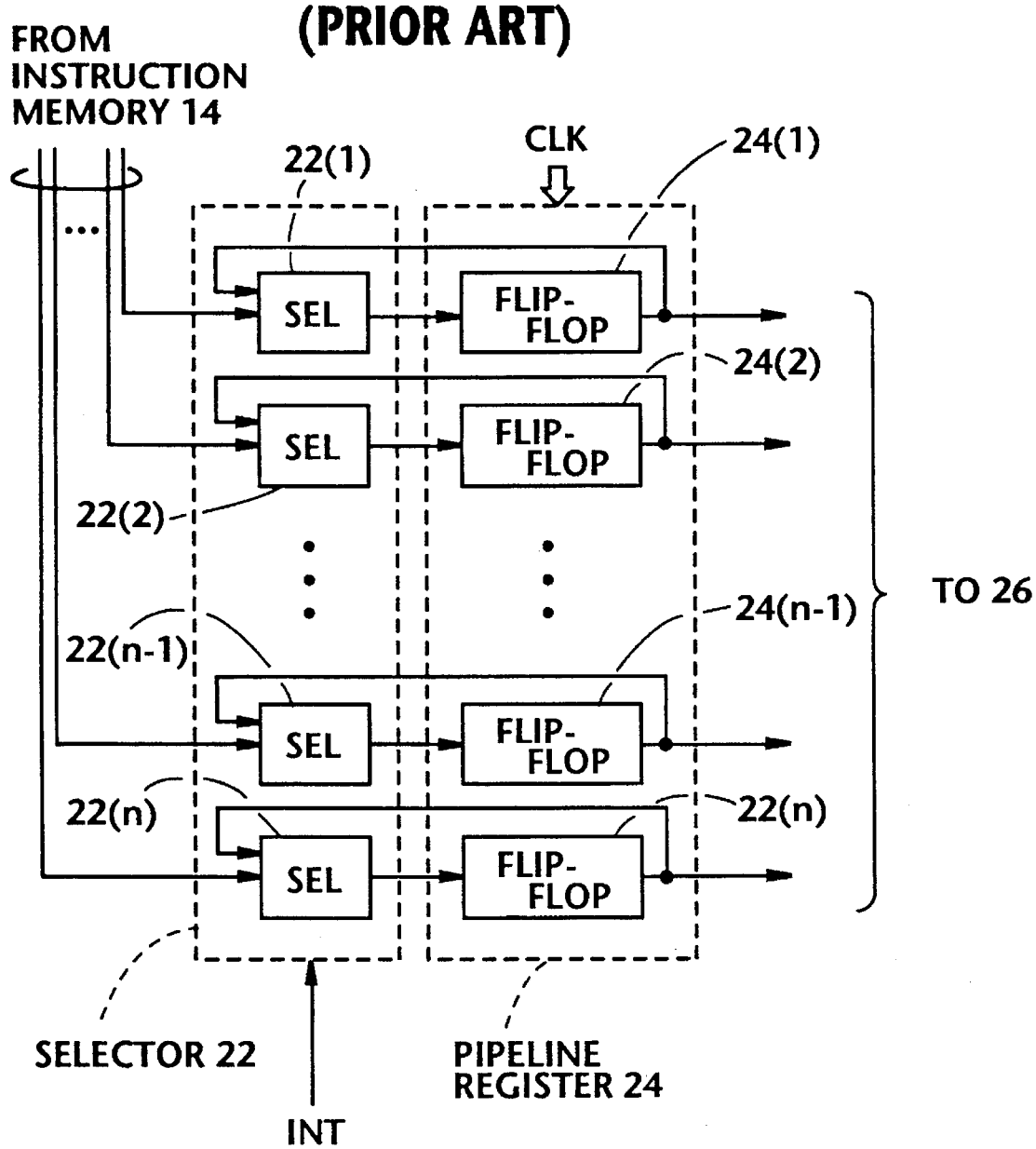
FIG. 5 is a block diagram showing in details two blocks of FIG. 1.
Figure 6:
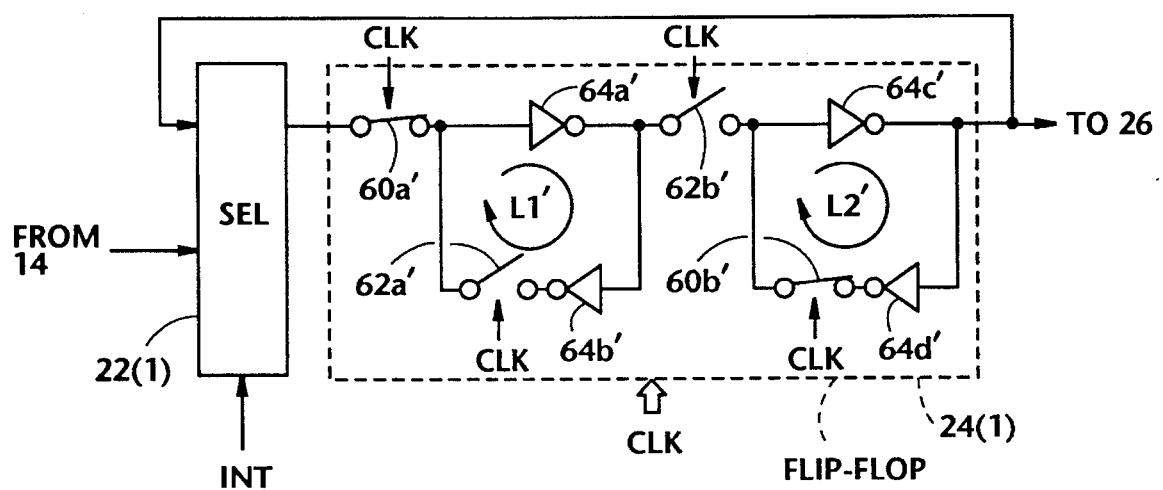
FIG. 6 is a block diagram showing in further detail the block of FIG. 5.
Figure 8:
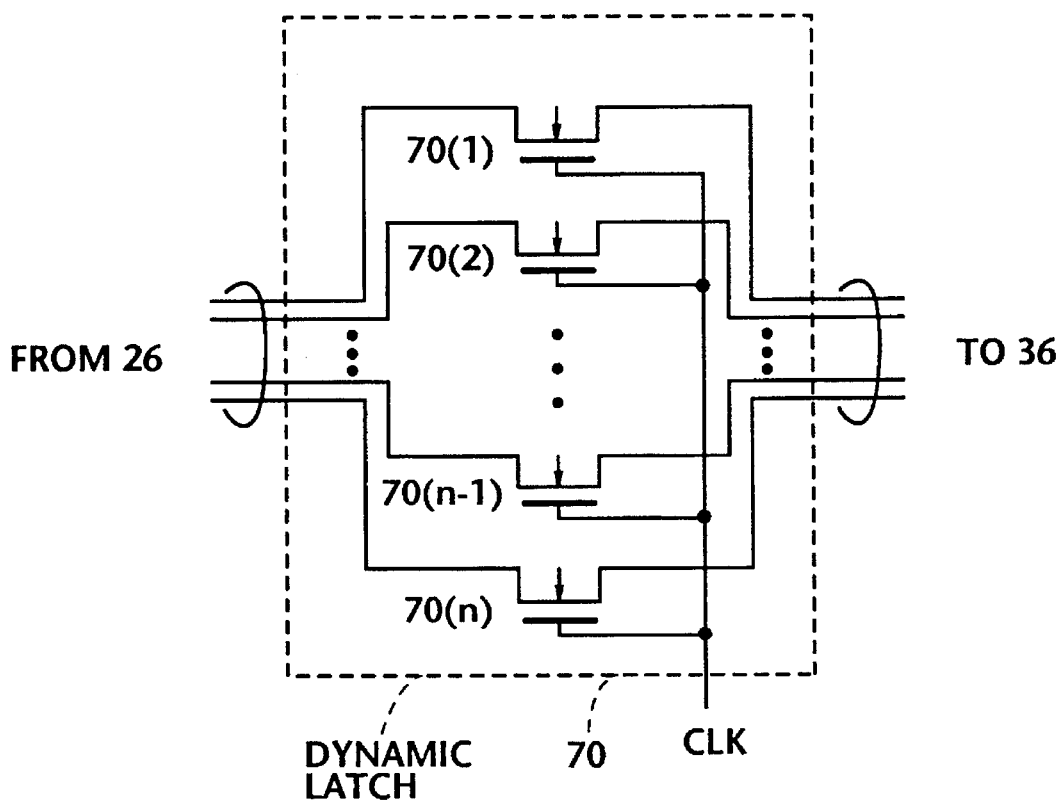
FIG. 8 is a block diagram showing in detail one example of a dynamic latch of FIG. 7.

FIG. 8 illustrates one example of the dynamic latch 70 which includes a plurality of n-channel MOSFETs (Metal Oxide Semiconductor Field Effect Transistor) $70(1)$–$70(n)$ (n is 32 or 64 (for example)) arranged in parallel between the blocks 26 and 36. It should be noted that each of the other dynamic latches 72, 74, 76, 78 and 80 is configured in exactly the same manner as the latch 70. It will readily be appreciated that each of the MOS transistors exhibits a very small delay relative to the corresponding flip-flop shown in FIGS. 4 and 6.

Figure 9:
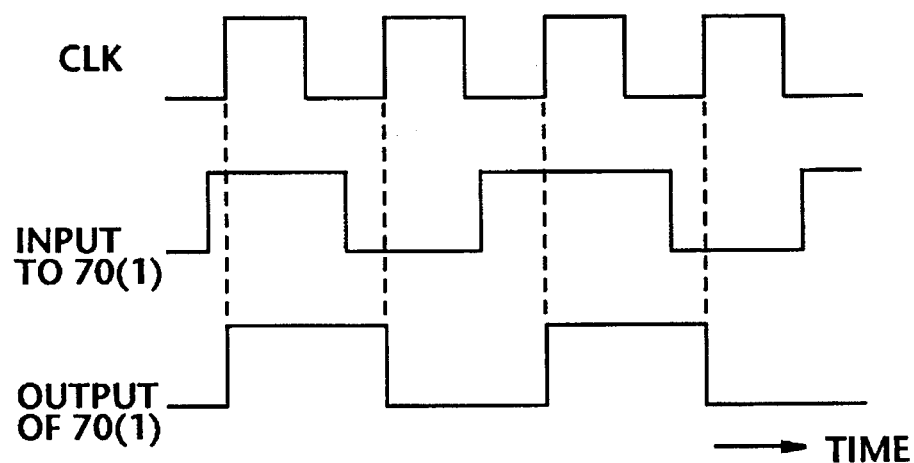
FIG. 9 is a timing chart showing the operation of the dynamic latch of FIG. 9.

FIG. 9 is a timing chart schematically showing the operations of the MOSFET 70(1). As shown, a logic level of a bit signal applied to the MOSFET 70(1) is latched in response to the rising edge of the clock CLK.

Figure 10:
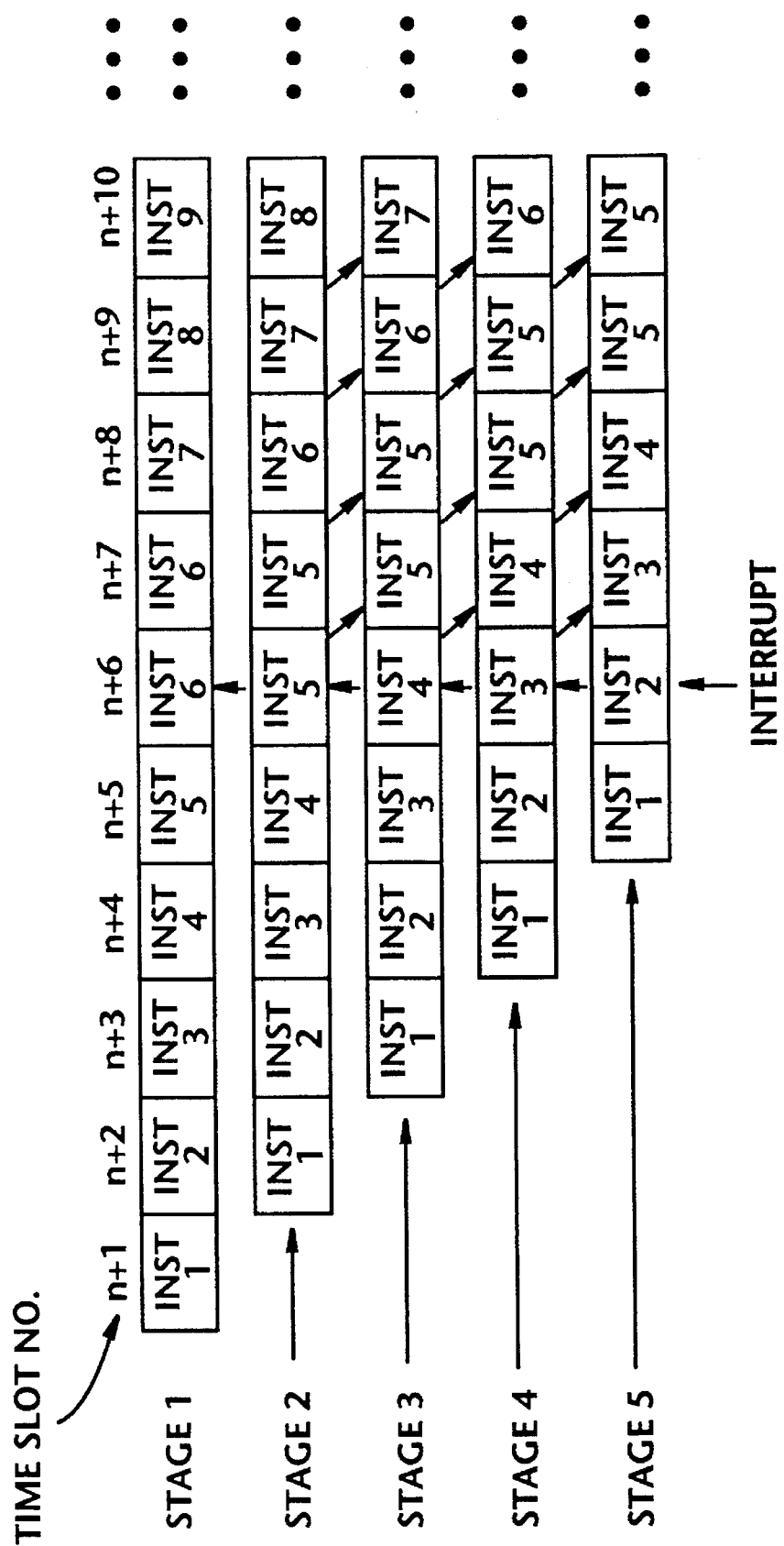
FIG. 10 is a timing chart for discussing the operation of the first embodiment of FIG. 7.

FIG. 10 is a timing chart showing the operations of the pipelined arrangement of FIG. 7. It is assumed that an interrupt for one time slot issues from the instruction decoder 20 at time slot (n+6). Therefore, the stage 1 and 2 respectively hold the instructions Nos. 6 and 5 applied at time slot (n+6) up to the next time slot (n+7) as mentioned in the opening paragraphs. On the other hand, each of the stages 3–5 is unable to retain an instruction over two time slots. However, each of the stages 3–5 successively receives an instruction from the preceding stage at one later time slot during time slots (n+7) to (n+10). Thus, the stages 1–5 returns to the normal operation at time slot (n+10) as illustrated in FIG. 10.

Figure 11:
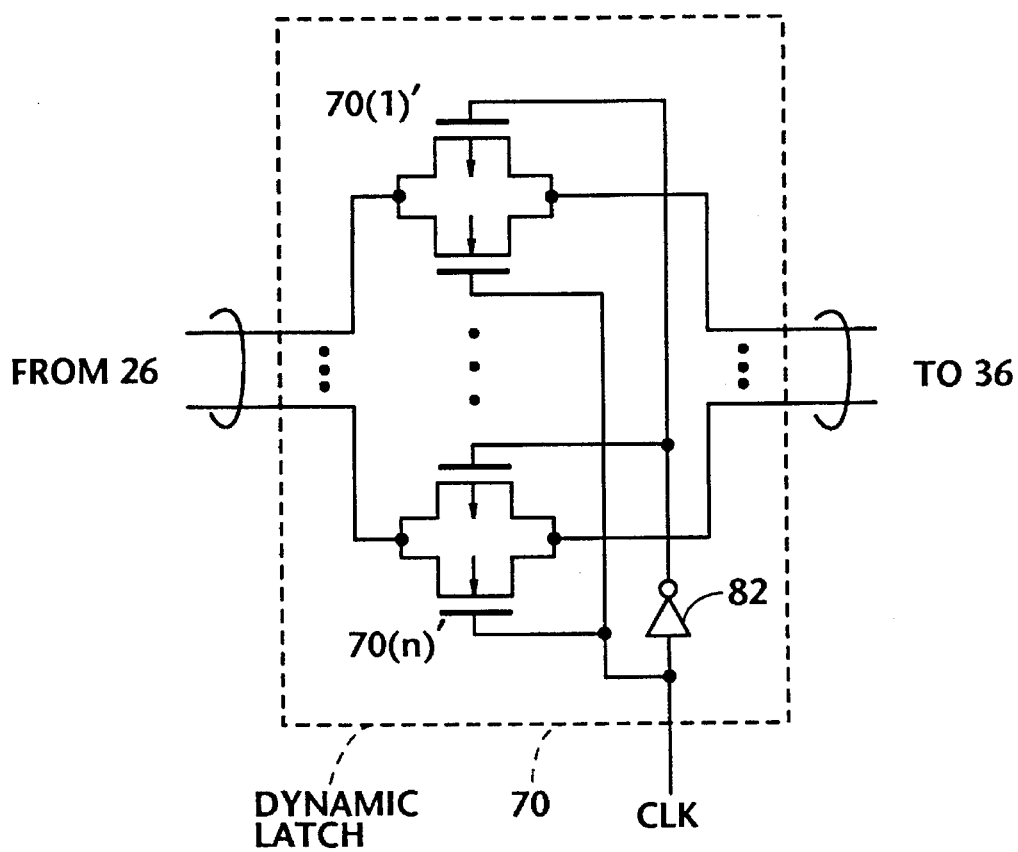
FIG. 11 is a diagram showing in detail another example of the dynamic latch of FIG. 7.

FIG. 11 illustrates another example of the dynamic latch 70 which in this case is comprised of a plurality of logics $70(1)'$–$70(n)'$ each of which consists of n-channel and p-channel MOSFETs arranged in parallel. An inverter 82 is to reverse the polarity of the clock CLK before being applied to each of the p-channel MOSFETs. Each of the other dynamic latches 72, 74, 76, 78 and 80 is configured in exactly the same manner as the latch 70 shown in FIG. 11.

Figure 12:
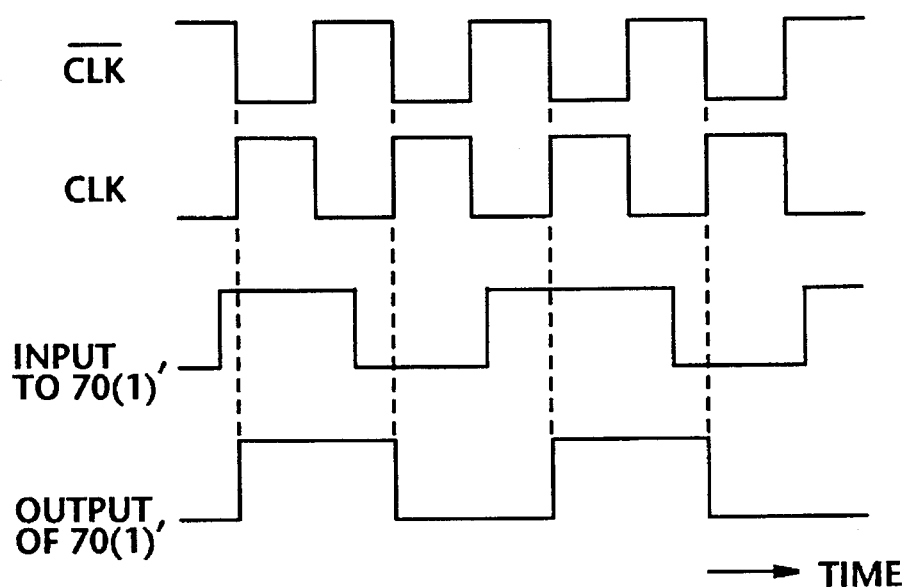
FIG. 12 is a timing chart showing the operation of the dynamic latch of FIG. 11.

FIG. 12 is a timing chart schematically showing the operations of the MOSFET logic $70(1)'$ by way of example. As shown, a logic level of a bit signal applied to the MOSFET logic $70(1)'$ is latched in response to the rising edge of the clock CLK and the leading edge of the clock /CLK.

Figure 13:
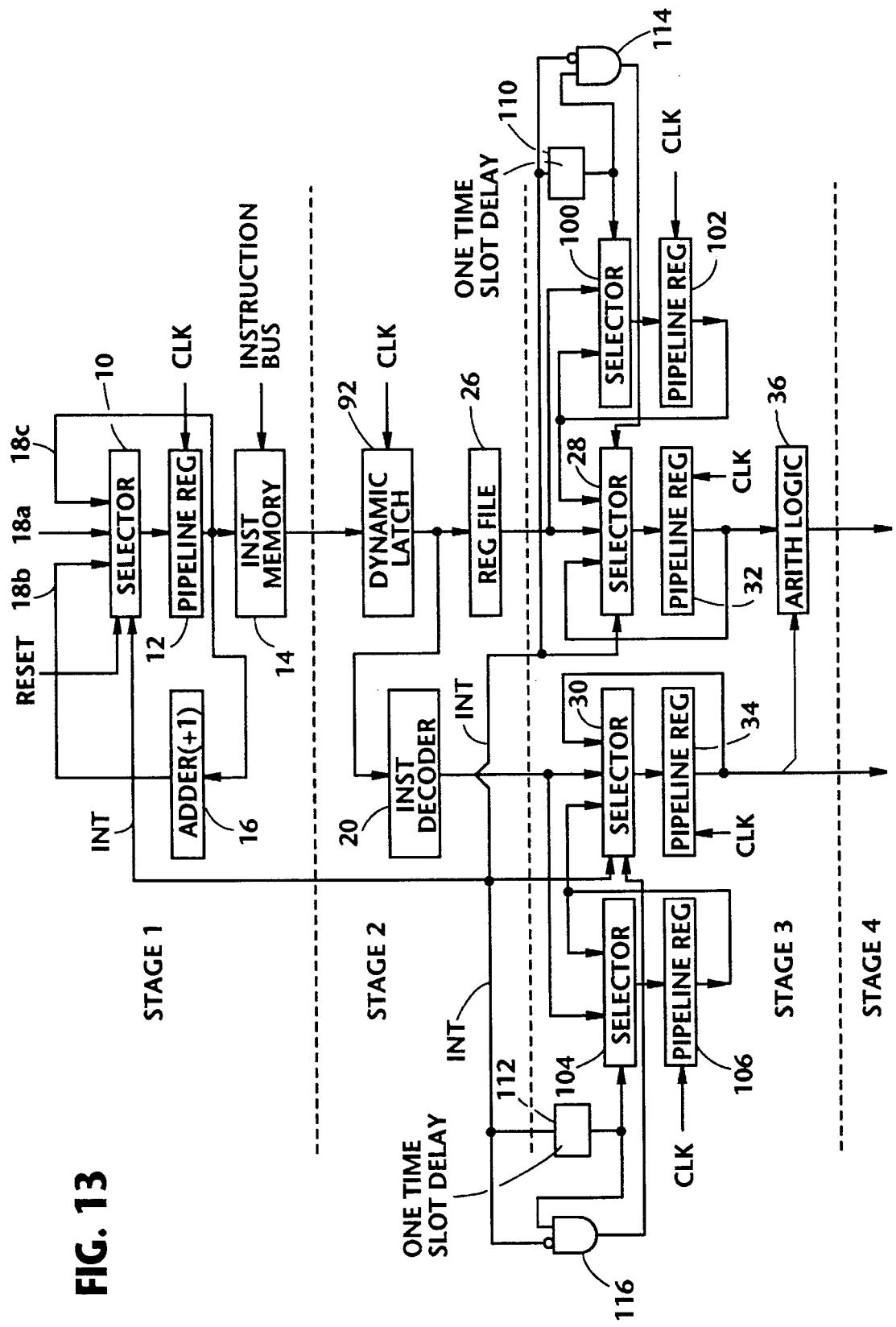
FIG. 13 is a block diagram schematically showing a second embodiment of the present invention.

FIG. 13 is a block diagram schematically showing a second embodiment of the present invention.

According to the second embodiment, a dynamic latch 92 replaces the selector 22 and the pipeline register 24 both of the stage 2 of FIG. 1. The dynamic latch 92 is configured as shown in FIG. 8 or FIG. 11. With the arrangement of the stage 2 of FIG. 13, the delay time due to the pipeline register 24 of FIG. 1 can be reduced to a considerable extent and thus, the time which can be allocated to the operation at the stage 2 of the second embodiment can effectively be expanded.

Figure 3:
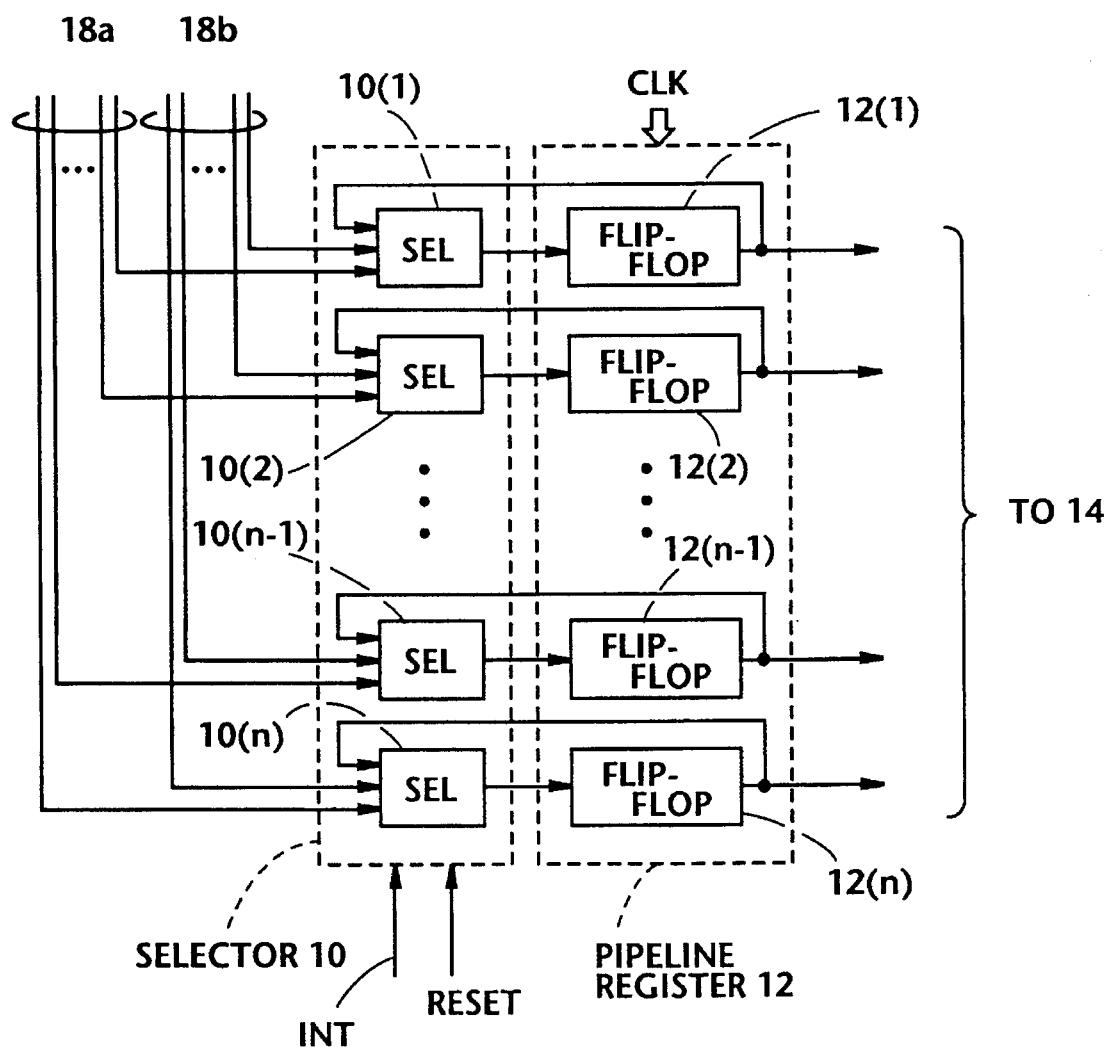
FIG. 3 is a block diagram showing in detail two blocks of FIG. 1.

As mentioned above, the dynamic latch is unable to hold an instruction in response to the interrupt request. In order to compensate for this operation at the stage 2, the second embodiment is provided with a stage 3 which further includes two selectors 100 and 104, two pipeline registers 102 and 106, two one time slot delays 110 and 112, and two AND gates 114 and 116 as compared with the stage 2 of FIG. 1. Each of the selectors 100 and 104 is configured in the same manner as shown in FIG. 3, while each of the pipeline registers 102 and 106 is the same as shown in FIG. 3.

The operation of the second embodiment will be described with reference to FIG. 14.

It is assumed that an interrupt request for one time slot occurs at time slot (n+5). In the stage 1, the instruction No. 5 is retained at the next time slot (n+6) as mentioned above. The stage 2 is supplied with the instruction No. 5 from the stage 1 at time slots (n+6) and (n+7). It should be noted that the dynamic latch 92 is unable to hold any data applied thereto.

In stage 3, the pipeline registers 32 and 34 hold the data No. 3 and the instruction No. 3 at time slot (n+6) in response to the interrupt signal INT applied to the selectors 28 and 30, respectively. On the other hand, the pipeline register 102 holds the data No. 4, applied from the register file 26, over two time slots (n+6) and (n+7) in response to the interrupt request INT which has been delay by one time slot at the delay 110. The delayed interrupt request INT is depicted by D in FIG. 14. Similarly, the pipeline register 106 holds the instruction No. 4, applied from the instruction decoder 20, over two time slots (n+6) and (n+7) in response to the interrupt request INT which has been delay by one time slot at the delay 112. The delayed interrupt request INT applied to the selector 104 is also depicted by D in FIG. 14.

It is assumed that the interrupt request INT assumes a high logic level "1". Accordingly, the AND gate 114 issues a low logic level "0" at time slot (n+5) in that the output of the delay 110 assumes a logic level "0" at this time duration. However, at the next time slot (n+7), the AND gate 114 issues a logic level "1" which is applied to the selector 28. In response to the output of the AND gate 114 which assumes a logic "1" at time slot (n+7), the selector 28 selects the output of the pipeline register 102. Thus, the data No. 4 stored in the register 102 is transferred to the register 32 at time slot (n+7), as shown in FIG. 14.

The same operation as mentioned above can be applied to the arrangement which includes blocks 112, 116, etc.

It will be understood that the above disclosure is representative of two possible embodiments of the present invention and that the concept on which the invention is based is not specifically limited thereto.

What is claimed is:

1. A pipelined data processing arrangement having a plurality of stages which are coupled in series and each of which includes temporary storage means, comprising:

a first stage for successively issuing a plurality of instructions in synchronism with time slots, said first stage including storage means which, in response to occurrence of an interrupt request, retains therein an instruction applied thereto over one or more time slots which follow a time slot wherein said interrupt request has been issued;

a second stage coupled to decode each of said instructions applied thereto from said first stage, said second stage issuing said interrupt request if pipelined operation should be interrupted, said second stage including storage means which, in response to said interrupt request, retains therein a decoded instruction over one or more time slots which follow said time slot wherein said interrupt request has been issued; and a plurality of data processing stages which follow said second stage, each of said data processing stages including dynamic latch means for holding a data processing instruction and data, both of which are applied from a previous stage, only during a time slot for which said data processing instruction is applied thereto.

2. A pipelined data processing arrangement as claimed in claim 1, wherein said dynamic latch means includes a plurality of transistors each of which takes a form of a MOSFET (Metal Oxide Semiconductor Field Effect Transistor).

3. A pipelined data processing arrangement as claimed in claim 1, wherein said dynamic latch means includes a plurality of combinations each comprising a p-channel MOSFET (Metal Oxide Semiconductor Field Effect Transistor) and an n-channel MOSFET coupled in parallel.

4. A pipelined data processing arrangement having a plurality of stages which are coupled in series, comprising:

a first stage which includes an instruction memory having a plurality of instructions stored therein, said first stage including a selector for selecting and reading out said plurality of instructions in a sequential order from said instruction memory at a rate of one instruction for each time slot, said each time slot being associated with a clock period of said pipelined data processing arrangement, wherein said first stage is also responsive to an interrupt signal by which said plurality of instructions are temporarily stopped from being read out of said instruction memory until said interrupt signal is deactivated;

a second stage coupled to the first stage and including an instruction decoder configured to sequentially decode said plurality of instructions as said instructions are read out from said instruction memory, said second stage also being responsive to said interrupt signal in which said plurality of instructions received from said first stage are temporarily stopped from being decoded until said interrupt signal is deactivated, said second stage further including a register file for storing the plurality of instructions read out of said instruction memory; and a plurality of data processing stages which follow said second stage, each of said data processing stages including a first dynamic latch and a second dynamic latch, said first dynamic latches being coupled in a series arrangement and said second dynamic latches being coupled in a series arrangement, wherein said corresponding first dynamic latch of one of said data processing stages which is directly coupled to said second stage is coupled to receive the sequentially decoded instructions from said instruction decoder of said second stage, and wherein said data processing stages do not receive the interrupt signal and are not responsive to the interrupt signal.

* * * * *